(12) United States Patent
Neuman (10) Patent No.: US 11,774,669 B1
(45) Date of Patent: Oct. 3, 2023

(54) EDGE-LIT SOLID-STATE LIGHTING APPARATUS

(71) Applicant: AUTOMATED ASSEMBLY CORPORATION, Lakeville, MN (US)

(72) Inventor: David Neuman, Randolph, MN (US)

(73) Assignee: AUTOMATED ASSEMBLY CORPORATION, Lakeville, MN (US)

( * ) Notice: Subject to any disclaimer, the term of this patent is extended or adjusted under 35 U.S.C. 154(b) by 0 days.

(21) Appl. No.: 18/085,321

(22) Filed: Dec. 20, 2022

Related U.S. Application Data

(63) Continuation of application No. 17/185,232, filed on Feb. 25, 2021, now Pat. No. 11,561,339.

(51) Int. Cl.
F21V 8/00 (2006.01)

(52) U.S. Cl.
CPC ........... *G02B 6/0083* (2013.01); *G02B 6/009* (2013.01)

(58) Field of Classification Search
CPC .. F21V 19/0025; F21V 23/005; F21V 23/002; G02B 6/0083
See application file for complete search history.

(56) References Cited

U.S. PATENT DOCUMENTS

| | | | |
|---|---|---|---|
| 8,779,694 B1 | 7/2014 | Lindblad et al. | |
| 9,128,222 B1 | 9/2015 | Lindblad et al. | |
| 9,606,285 B1 * | 3/2017 | Lindblad | F21V 23/002 |
| 10,168,037 B1 * | 1/2019 | Neuman | F21K 9/90 |
| 10,168,463 B1 | 1/2019 | Neuman et al. | |
| 10,655,823 B1 | 5/2020 | Lindblad et al. | |
| 11,561,339 B1 | 1/2023 | Neuman | |
| 2012/0238045 A1 * | 9/2012 | Roberts | F21K 9/90 438/28 |
| 2012/0300495 A1 * | 11/2012 | Kim | G02B 6/0026 362/606 |

OTHER PUBLICATIONS

Osram, Duris® E 5050 RGBW, https://www.osram.com/os/products/product-promotions/led-for-general-lighting/duris_e.jsp, printed Feb. 24, 2021.
Mouser Electronics, Osram Opto Semiconductors GW J9LHS1.4M Duris® E 5050LEDs, https://www.mouser.com/new/osram/osram-gw-j9lhs1-4m-leds/, Copywrite 2021, Published Jul. 21, 2020.

* cited by examiner

*Primary Examiner* — William J Carter
(74) *Attorney, Agent, or Firm* — Crawford Maunu PLLC (57) ABSTRACT

A lighting apparatus includes an elongate substrate, a supply rail disposed on one surface of the substrate, and first and second ground rails disposed on the other surface. SSL packages are disposed parallel to the longitudinal axis of the substrate and between the first and second ground rails. Each package has SSL elements disposed on a first side and pairs of contact pads disposed on a second side. The SSL packages are serially coupled from the first package to the last package. One contact pad of each pair of the contact pads of the first package is coupled to the supply rail through the substrate, one contact pad of a first pair of the pairs of contact pads of the last package is coupled to the first ground rail at the first surface of the substrate, and one contact pad of a second pair of the pairs of contact pads of the last package is coupled to the second ground rail at the first surface of the substrate.

16 Claims, 8 Drawing Sheets

EDGE-LIT SOLID-STATE LIGHTING APPARATUS

FIELD OF THE INVENTION

The disclosed embodiments generally relate to edge-lit solid-state lighting arrangements.

BACKGROUND

Solid-state lighting (SSL) apparatuses have semiconductor structures that emit light. Examples of SSL lighting elements include light-emitting diodes (LEDs), semiconductor laser diodes (LDs), organic light-emitting diodes (OLED), polymer light-emitting diodes (PLED), or quantum dots. SSL is becoming more popular due in part to the energy efficient qualities and durability of SSL. Applications for SSL may include advertising signage, decorations, or utility and general purpose lighting. In some implementations, SSL elements are placed along one or more edges of a light-transmitting panel, and the light-transmitting panel is configured to evenly distribute light emitted from the SSL elements through a surface of the panel.

With an edge-lit light-transmitting panel, light from the SSL elements is spread evenly through the panel by total internal reflection. Disruptions formed on the surface of the panel scatter incident light so that light is emitted from the surface of the panel.

SUMMARY

A disclosed lighting apparatus includes an elongate substrate having opposite first and second surfaces and a longitudinal axis. A supply rail is disposed on the second surface of the substrate, a first ground rail is disposed on the first surface and along a first elongate edge of the substrate, and a second ground rail is disposed on the first surface and along a second elongate edge of the substrate. A plurality of solid state lighting (SSL) packages are disposed parallel to the longitudinal axis and between the first and second ground rails on the first surface of the substrate. The plurality of packages includes a first package and a last package, and each package has a plurality of SSL elements disposed on a first side and pairs of contact pads disposed on a second side opposite the first side. The SSL packages are serially coupled from the first package to the last package. One contact pad of each pair of the contact pads of the first package is coupled to the supply rail through the substrate. One contact pad of a first pair of the pairs of contact pads of the last package is coupled to the first ground rail at the first surface of the substrate. One contact pad of a second pair of the pairs of contact pads of the last package is coupled to the second ground rail at the first surface of the substrate.

Another disclosed lighting apparatus includes a light-diffusive panel having opposing faces bounded by one or more sides. The light-diffusive panel has a plurality of disruptions on a first face of the opposing faces. A light strip is attached to one of the sides of the light-diffusive panel. The light strip includes an elongate substrate having opposite first and second surfaces and a longitudinal axis. A supply rail is disposed on the second surface of the substrate, a first ground rail is disposed on the first surface and along a first elongate edge of the substrate, and a second ground rail is disposed on the first surface and along a second elongate edge of the substrate. A plurality of solid state lighting (SSL) packages are disposed parallel to the longitudinal axis and between the first and second ground rails on the first surface of the substrate. The plurality of packages includes a first package and a last package, and each package has a plurality of SSL elements disposed on a first side and pairs of contact pads disposed on a second side opposite the first side. The SSL packages are serially coupled from the first package to the last package. One contact pad of each pair of the contact pads of the first package is coupled to the supply rail through the substrate. One contact pad of a first pair of the pairs of contact pads of the last package is coupled to the first ground rail at the first surface of the substrate. One contact pad of a second pair of the pairs of contact pads of the last package is coupled to the second ground rail at the first surface of the substrate.

The above summary is not intended to describe each disclosed embodiment. The figures and detailed description that follow provide additional example embodiments and aspects.

BRIEF DESCRIPTION OF THE DRAWINGS

Other aspects and advantages will become apparent upon review of the Detailed Description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Edge-lit lighting arrangements for applications such as signage often include light-diffusive panels made from a transparent thermoplastic such as polymethyl methacrylate (PMMA or "acrylic glass"). Signage applications often involve very large panels and can be very expensive.

The arrangement of SSL elements in an integrated circuit package significantly affects the required thickness of the panel. That is, in a structure in which the package is disposed proximate an edge of the panel, the panel must be sufficiently thick to capture the light emitted from all the SSL elements in the package in order to distribute the light throughout the panel. For example, acrylic panels are available in standard thicknesses ranging from 1.5 mm to 24 mm. An acrylic panel that is 6 mm thick may be required to accommodate an SSL package in which the SSL elements are arranged as a rectangle on the package. If the SSL package configuration necessitates a 6 mm panel as compared to a 3 mm panel, the weight of the panel would double and the cost of the panel would increase correspondingly. Designers desire use of thinner panels in order to reduce costs and weight, and large panels require a large number of lighting elements, which require efficient distribution of power. Thus, designers are confronted with competing design challenges presented by configurations of SSL packages, cost, weight, and power distribution.

This disclosure describes lighting arrangements that in large panel applications can reduce cost and weight and efficiently distribute power to SSL elements. According to the disclosed approaches, an elongate, substrate has a power supply rail attached to one surface and two ground rails attached to the other surface. The supply rail and ground rails run parallel to a longitudinal axis of the substrate, and the ground rails are disposed along edges of the substrate.

The large supply and ground rails aid in efficient distribution of power and dissipation of heat generated by the SSL elements. The ground rails attached to the same substrate surface as the SSL packages also serve as spacers between the substrate and a light-diffusive panel in an arrangement in which the light strip is folded as illustrated below.

SSL packages are arranged and coupled in groups of two or more packages on the substrate. The SSL packages are disposed on the same surface of the substrate as the two ground rails and are disposed between the ground rails. Each SSL package has pairs of contact pads on the side of the package that faces toward the substrate. The SSL packages in each group are serially coupled from the first SSL package to the last SSL package in the group.

One contact pad of each pair of the contact pads of the first SSL package of each group is coupled to the supply rail through the substrate. The last SSL package in each group has one contact pad of each pair coupled to a respective one of the ground rails. For example, one contact pad of a first pair of the pairs of contact pads of the last SSL package of each group is coupled to the one of the ground rails at the first surface of the substrate, and one contact pad of a second pair of the pairs of contact pads of the last SSL package is coupled to the other ground rail at the first surface of the substrate.

Figure 1:
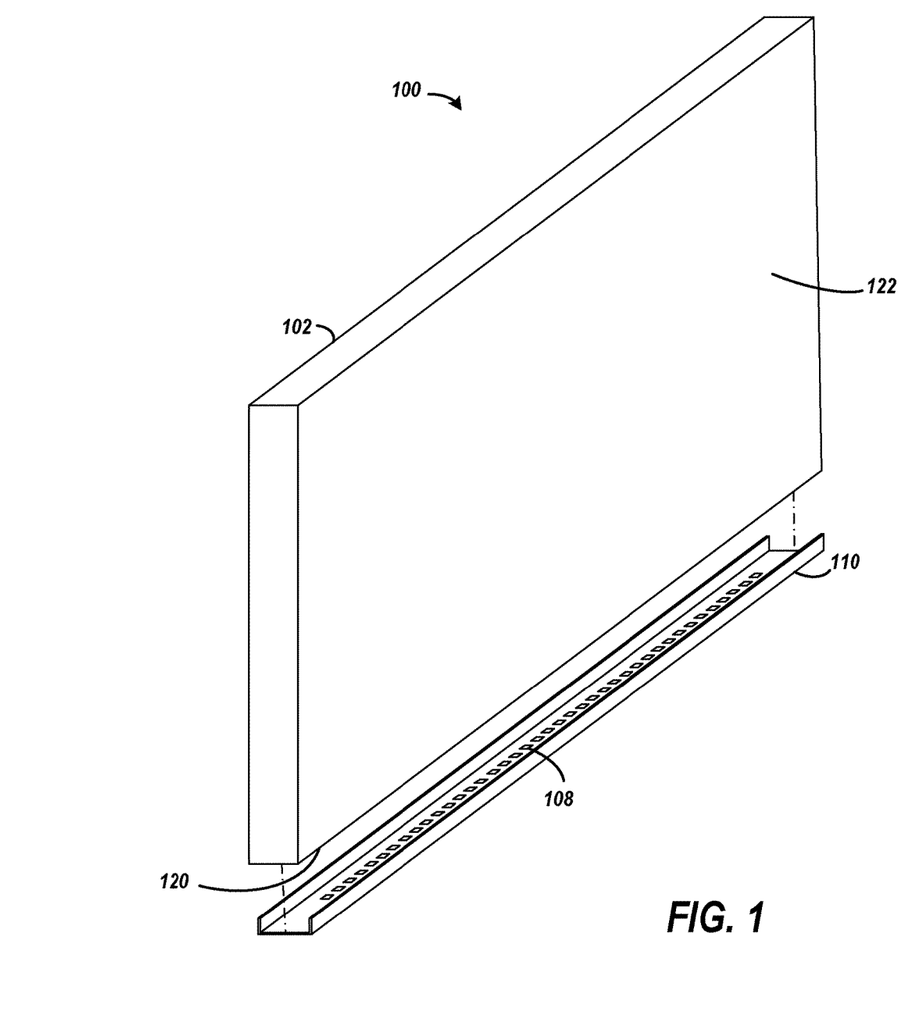
FIG. 1 shows a perspective view of an edge-lit lighting apparatus.

FIG. 1 shows a perspective view of an edge-lit lighting apparatus 100. The lighting apparatus includes light-diffusive panel 102 and a light strip having packages 108 of solid-state lighting (SSL) elements. The packages are attached to an elongated substrate 110. The substrate can be attached to a carrier (not shown), and the carrier and substrate can be attached to the light-diffusive panel, such as by pressure sensitive adhesive (PSA), such that the SSL elements 108 face the side (or "edge") 120 and emit light into the panel.

With an edge-lit lighting apparatus, light from the SSL elements is spread evenly through the light-diffusive panel by total internal reflection. Disruptions (not shown) on the surface 122 of the panel scatter incident light so that light is emitted from that face of the panel. The disruptions can be formed on one or both faces of the panel. The lighting apparatus can further include a reflective material (not shown) disposed on one of the faces of the panel so that light is emitted only from the other face of the panel.

The lighting apparatus 100 can employ the arrangements of SSL packages and substrates described in the following paragraphs.

Figure 2:
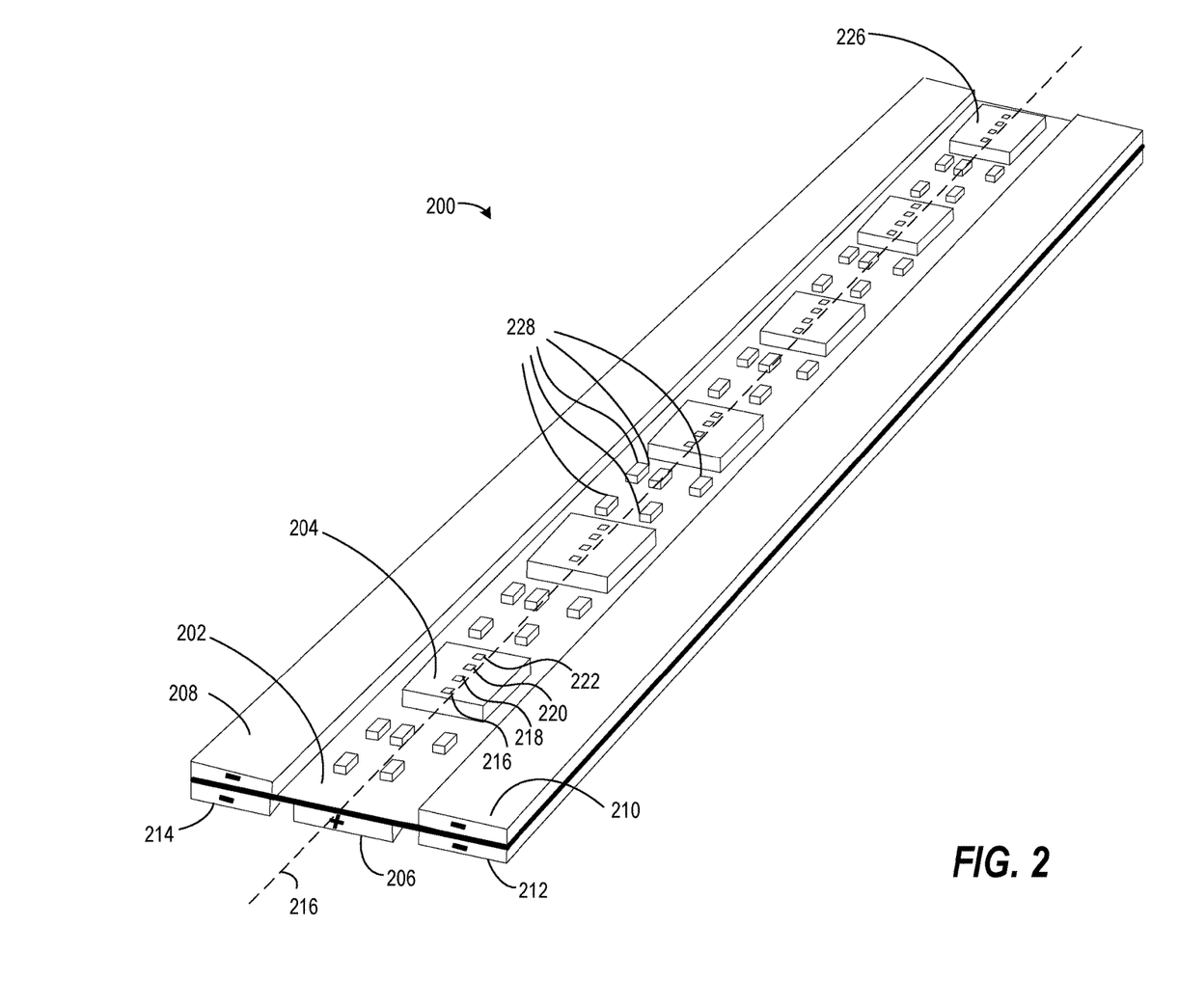
FIG. 2 shows an exemplary light strip or portion of a light strip.

FIG. 2 shows an exemplary light strip 200 or portion of a light strip. The exemplary light strip includes a flexible substrate 202, a group of SSL packages (e.g., SSL package 204), a supply rail 206, and four ground rails 208, 210, 212, 214.

The flexible substrate 202 is elongate, and the SSL packages are attached by a suitable adhesive to one of the surfaces of the substrate and are arranged parallel to the longitudinal axis 216 of the substrate. Each of the SSL packages has multiple SSL elements, and the SSL elements are arranged in a single row on the package. The SSL packages are advantageously oriented on the substrate in that the SSL elements are parallel to and proximate the longitudinal axis. The SSL packages are arranged such that the SSL elements of the packages can be aligned with an edge of a light-diffusive panel. The arrangement of SSL elements and orientation of the packages allows a thinner light-diffusive panel in an edge-lit lighting apparatus than would be possible if the SSL elements were arranged rectilinearly or the packages were oriented differently. For example, a 3 mm panel may be possible instead of a 6 mm panel. With the preferred orientation of the SSL packages, a thinner panel may be used even though each SSL package may be wider than the panel is thick.

Each of exemplary SSL packages has four SSL elements. For example, SSL package 204 has SSL elements 216, 218, 220, and 222. Though the exemplary packages are shown as having four SSL elements, it will be recognized that alternative implementations could have fewer SSL elements (e.g., 2 or 3 elements) or more than four SSL elements.

The power supply rail 206 can be attached to the substrate by a suitable adhesive. The supply rail is attached to the surface of the substrate opposite the surface on which the SSL packages are attached. The supply rail is arranged parallel to the longitudinal axis 216 and disposed beneath the SSL packages.

The light strip 200 has four ground rails, which is the number of SSL elements in a package. The ground rails can also attached to the substrate by a suitable adhesive. The number of ground rails is equal to the number of SSL elements in a package. For example, the light strip would have only two ground rails if the SSL packages each had two SSL elements. Ground rails 208 and 210 are attached to the same surface of the substrate as the SSL packages, and ground rails 212 and 214 are attached to the surface of the substrate opposite the surface having the SSL packages. Ground rails 208 and 214 are disposed along one elongate edge of the substrate, and ground rails 210 and 212 are disposed along the opposite elongate edge of the substrate. The SSL packages are disposed between ground rails 208 and 210

The configuration of the supply rail 206 and ground rails 208, 210, 212, and 214 efficiently distributes power, effectively dissipates heat from the SSL elements, and enables individual control over the SSL elements. The SSL packages in the group are serially coupled from a first SSL package 226 to a last SSL package 204 of the group.

The supply rail 206 efficiently distributes power to multiple groups of SSL packages. The SSL packages of each group are serially coupled, such as by conductive traces on surfaces of the substrate. Thus, distributing power to a large number of SSL packages serially connected by traces alone would be problematic. To avoid problems, each group is limited to a smaller number of packages, e.g., 6 packages in one application, and the supply rail delivers power to the first SSL package of each group of SSL packages. Each SSL element of a package has a pair of contact pads, and one contact pad of each pair of the pairs of contact pads of the first SSL package of each group can be directly coupled to the supply rail through the substrate.

As the SSL elements of the same type are serially coupled between packages in the group, and there is a separate ground rail for each type of SSL element, the different types of SSL elements can be individually controlled. For example, the SSL elements can be controlled through pulse width modulation of the channels by a controller (not shown) connected to the individual ground rails. For the last SSL package of a group, e.g., package 204, one contact pad of a first pair of the pairs of contact pads is coupled to the one of the ground rails, and one contact pad of a second pair of the pairs of contact pads is coupled to another one of the ground rails.

The large cross-sectional area of the supply rail and ground rails efficiently deliver power to the SSL elements, and the larger surface area effectively dissipates the generated heat. The rails can be copper, aluminum or other conductive metal providing sufficient conductivity. In exemplary embodiments, the supply rail can be sized to provide conductivity equivalent to copper wire in the range of 10 to 14 gauge. The ground rails can be smaller.

The light strip can include resistors 228 coupled between the SSL packages for current control.

Figure 3:
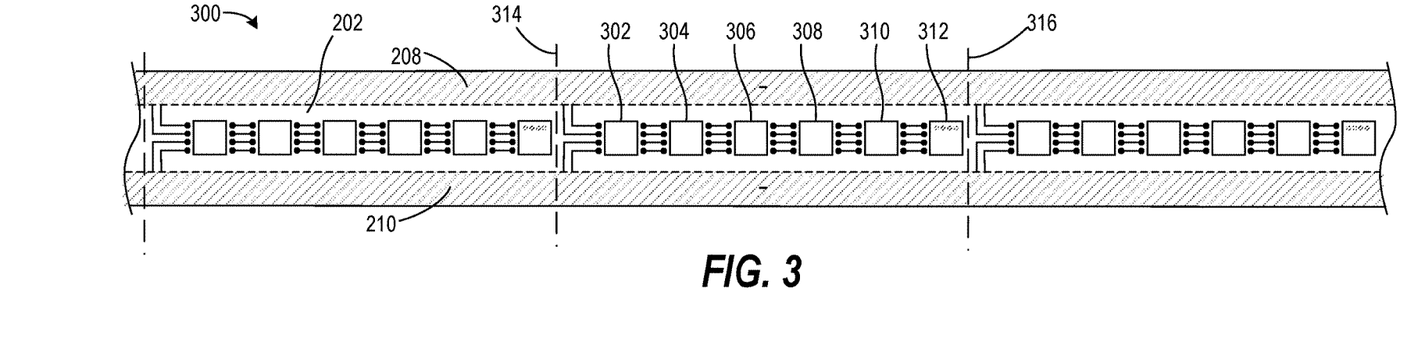
FIG. 3 shows a top view of a portion of an exemplary light strip having three groups of SSL packages.

FIG. 3 shows a top view of a portion of an exemplary light strip 300 having three groups of SSL packages. The substrate 202, supply rail, and ground rails are as previously described. The supply rail is on the backside of the substrate and is not visible in the top view. The light strip has four ground rails. The top-side ground rails 208 and 210 are visible, and the bottom-side ground rails are hidden from view.

Three groups of six SSL packages are shown on light strip 300, and each exemplary SSL package has 4 SSL elements (not shown). Depending on design objectives and constraints, each group could have fewer or more than six packages, and each SSL package could have fewer or more than four SSL elements.

The SSL packages in each group are serially coupled, and the groups are coupled in parallel. For example, SSL packages 302, 304, 306, 308, 310, and 312 comprise one group and are serially coupled from the first SSL package 312 of the group to the last SSL package 302 of the group.

The first SSL package in each group (e.g., package 312) can be directly coupled to the supply rail (not shown). The last SSL package in each group (e.g., package 302) is coupled to the ground rails, either directly or through resistors such as the exemplary resistors 228 in FIG. 2.

The light strip 300 can be manufactured with any number of groups of SSL packages, depending on manufacturing capabilities. The light strip 300 can be cut at desired ones of cut lines, which are shown as dashed lines 314 and 316, for example, to provide smaller light strips of desired lengths.

Figure 4:
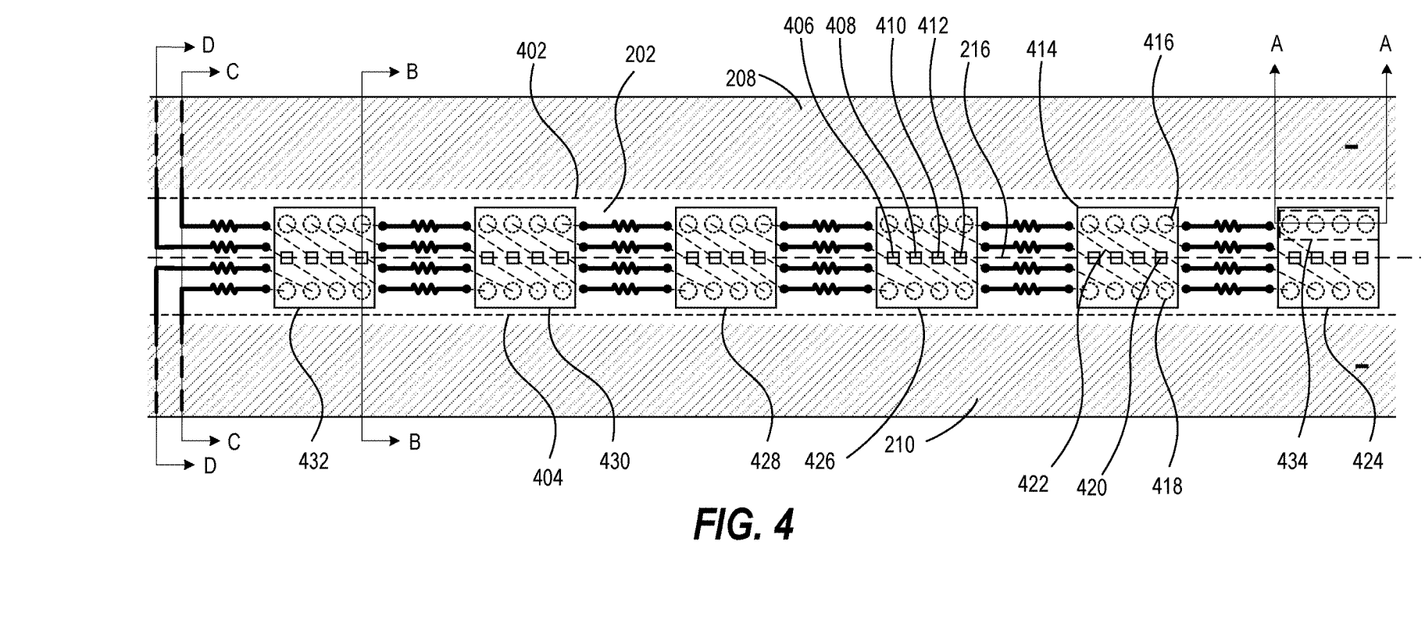
FIG. 4 shows a top view of a group of SSL packages of an exemplary light strip.

FIG. 4 shows a top view of a group of SSL packages of an exemplary light strip. The view of FIG. 4 shows the light emitting side of the light strip and provides added detail to the view of FIG. 3. The substrate 202, supply rail, and ground rails are as previously described. The supply rail is on the backside of the substrate and not visible in the top view. The light strip has four ground rails. The top-side ground rails 208 and 210 are visible, and the bottom-side ground rails are hidden from view.

Figure 9:
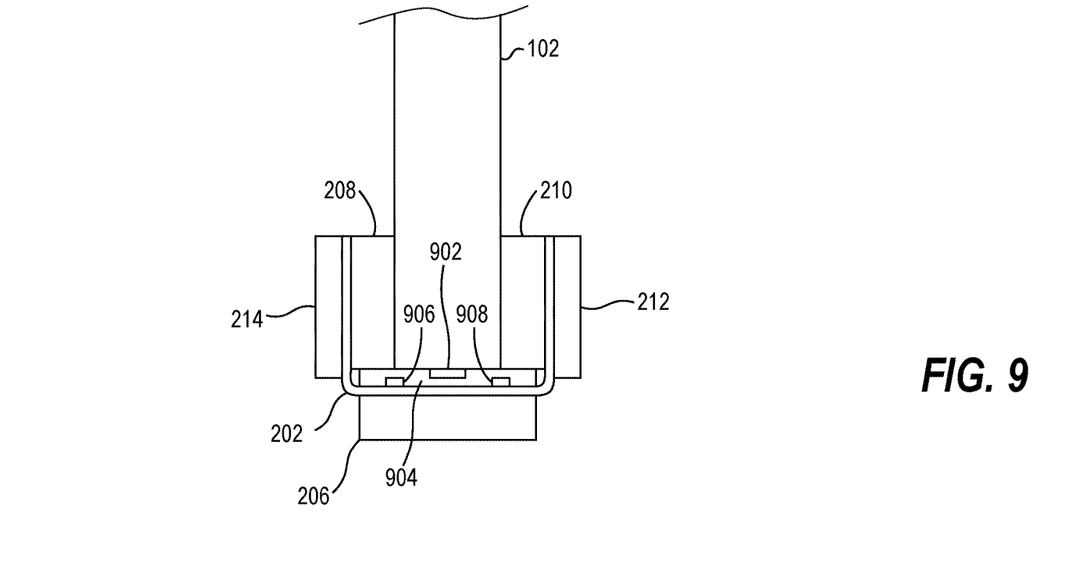
FIG. 9 shows a partial cross-sectional view of a portion of an edge-lit lighting apparatus having the light strip of FIG. 4 wrapped around an edge of a light-diffusive panel.

Dashed lines 402 and 404 represent lines at which the light strip can be folded into a "U" shape, as illustrated in FIGS. 1 and 9.

Each exemplary SSL package has four SSL elements arranged in a row and disposed parallel to the longitudinal axis 216 of the substrate. SSL elements 406, 408, 410, and 412 are examples of the four SSL elements of a package. Respective pairs of contact pads are connected to the SSL elements of each package. The contact pads are disposed on backsides of the SSL packages. One of the contact pads of each pair connects to the positive terminal and the other contact pad of each pair connects to the negative terminal of the SSL element. For example, in SSL package 414, pads 416 and 418 are one pair of pads and connect to the positive and negative terminals of SSL element 420, respectively. The other contact pads of package 414 are similarly paired and connect to the other SSL elements of the package.

Each contact pad is connected to a conductive trace on the backside of the substrate 202. The backside traces are shown as diagonal dashed lines. For example, trace 422 is connected to pad 418 through a via (not shown) in the substrate. The backside traces are routed beneath the SSL packages on the backside of the substrate.

Like SSL elements of the SSL packages in a group are serially coupled. For example, if an SSL package has red, green, blue, and white SSL elements, the red SSL elements of the packages are serially connected, the green SSL elements are serially connected, etc. For example, the red SSL element of packages 424, 414, 426, 428, 430, and 432 are serially coupled.

Front side traces are disposed on the substrate 202 between the packages and provide paths for resistors to control current to the SSL elements.

The circuit routes follow a path (as additionally illustrated in the cross-sectional views of FIGS. 5-8) that begins at the supply rail on the backside of the substrate and connects through vias (not shown) to ones of the contact pads of package 424 (cutline A), continues through the SSL elements of the package to the other contact pads of the package, continues through vias (not shown) to backside traces on the backside of the substrate, continues along the backside traces to vias that connect to front side traces and resistors on the substrate, continues to vias that connect to backside traces that in turn connect to ones of the pads of the next SSL package 414. The vias that connect to the front side traces are shown as filled circles that connect to the resistors. The circuit paths continue through the last SSL package 432 in the group.

The flexible substrate can have an electrically insulative coating (or "cover coat") that covers the substrate and electrically conductive traces. Openings in the coating exposes the traces to the conductive material of the rails for coupling the supply rail and ground rails to the first and last SSL packages in the group. The opening in the insulative coating of the substrate for connecting to the supply rail is shown as dashed block 434. The opening can be disposed proximate one contact pad of each of the pairs of contact pads of package 424 and exposes the conductive material of the supply rail for connecting to those pads.

Additional openings (not shown) in the insulative coating of the substrate expose the ground rails for connecting to the last SSL package in the group are shown as dashed blocks.

Cut-lines A, B, C, and D denote cross-sectional views shown in FIGS. 5, 6, 7, and 8, respectively.

Figure 5:
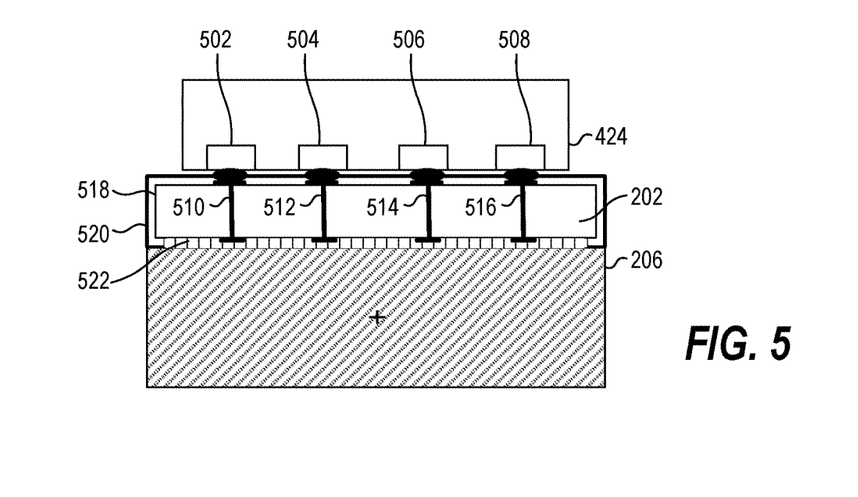
FIG. 5 shows a cross-sectional view of the light strip of FIG. 4 taken along cutline A.

FIG. 5 shows a cross-sectional view of the light strip of FIG. 4 taken along cutline A. FIG. 5 shows the electrical connection of the first SSL package 424 of a group to the supply rail 206 through substrate 202. Note that the thicknesses of the substrate and rails may be exaggerated and not proportionate to actual thicknesses in some of the figures in order to aid in illustrating various features. The first SSL package of each group of SSL packages is connected to the supply rail as shown in FIG. 5.

The insulative coating of the substrate 202 is depicted by the space between the relatively thin line 518 and the relatively thicker line 520. The contact pads 502, 504, 506, and 508 are exposed on the bottom side of SSL package. The contact pads can be soldered to pads/traces on the front side of the substrate, which are connected to pads/traces on the backside of the substrate through vias 510, 512, 514, and 516. An opening in the insulative coating exposes the pads/traces on the backside of the substrate for connecting to the power rail 206. Conductive adhesive 522 can be disposed in opening to electrically connect the pads/traces to the power rail.

Figure 6:
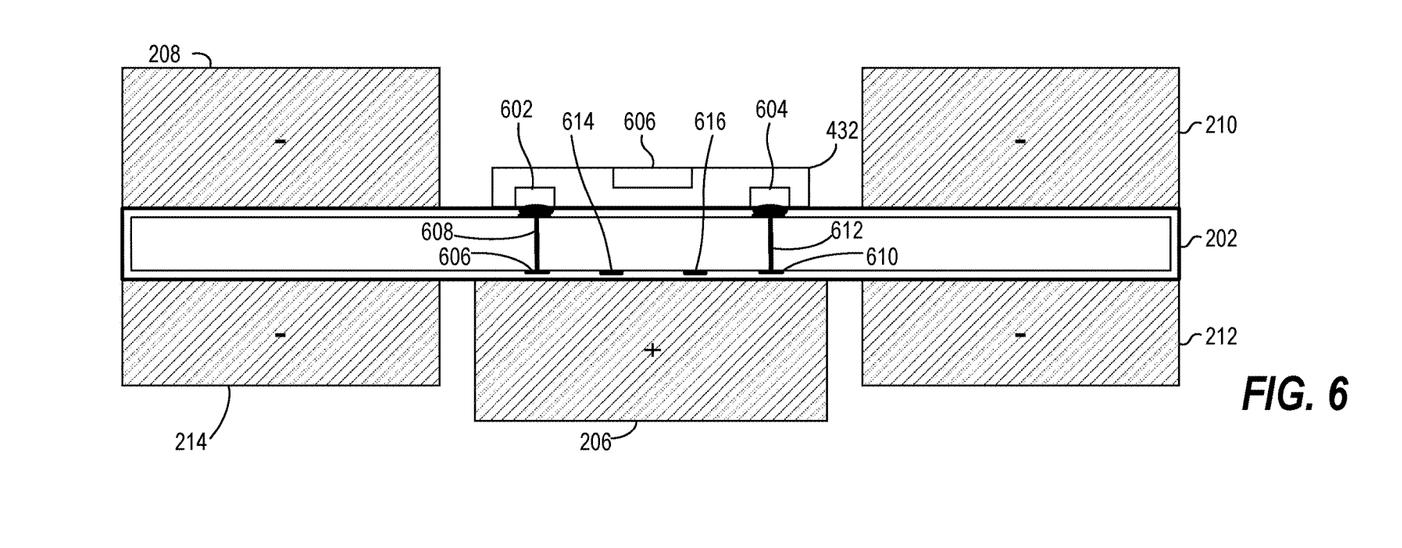
FIG. 6 shows a cross-sectional view of the light strip of FIG. 4 taken along cutline B.

FIG. 6 shows a cross-sectional view of the light strip of FIG. 4 taken along cutline B. FIG. 6 shows the connection of a pair of contact pads 602 and 604 to the backside traces of the substrate 202. The insulative coatings of the supply rail and ground rails are depicted by the relatively thick lines. The contact pads 602 and 604 are exposed on the bottom side of SSL package 432 and can be soldered to pads/traces on the front side of the substrate. The pair of contact pads provide power to the SSL element 606. One contact pad of the pair, e.g., 604, can be connected to the positive terminal of the SSL element, and the other pad of the pair, e.g., 602, can be connected to the negative terminal of the SSL element.

The pads/traces on the front side of the substrate are connected to the traces on the backside of the substrate through vias and the connected terminal ends. Contact pad 602 is connected to trace 606 through via 608. Similarly, contact pad 604 is connected to trace 610 through via 612. Traces 614 and 616 connect to other contact pads of the SSL package 432.

Figure 7:
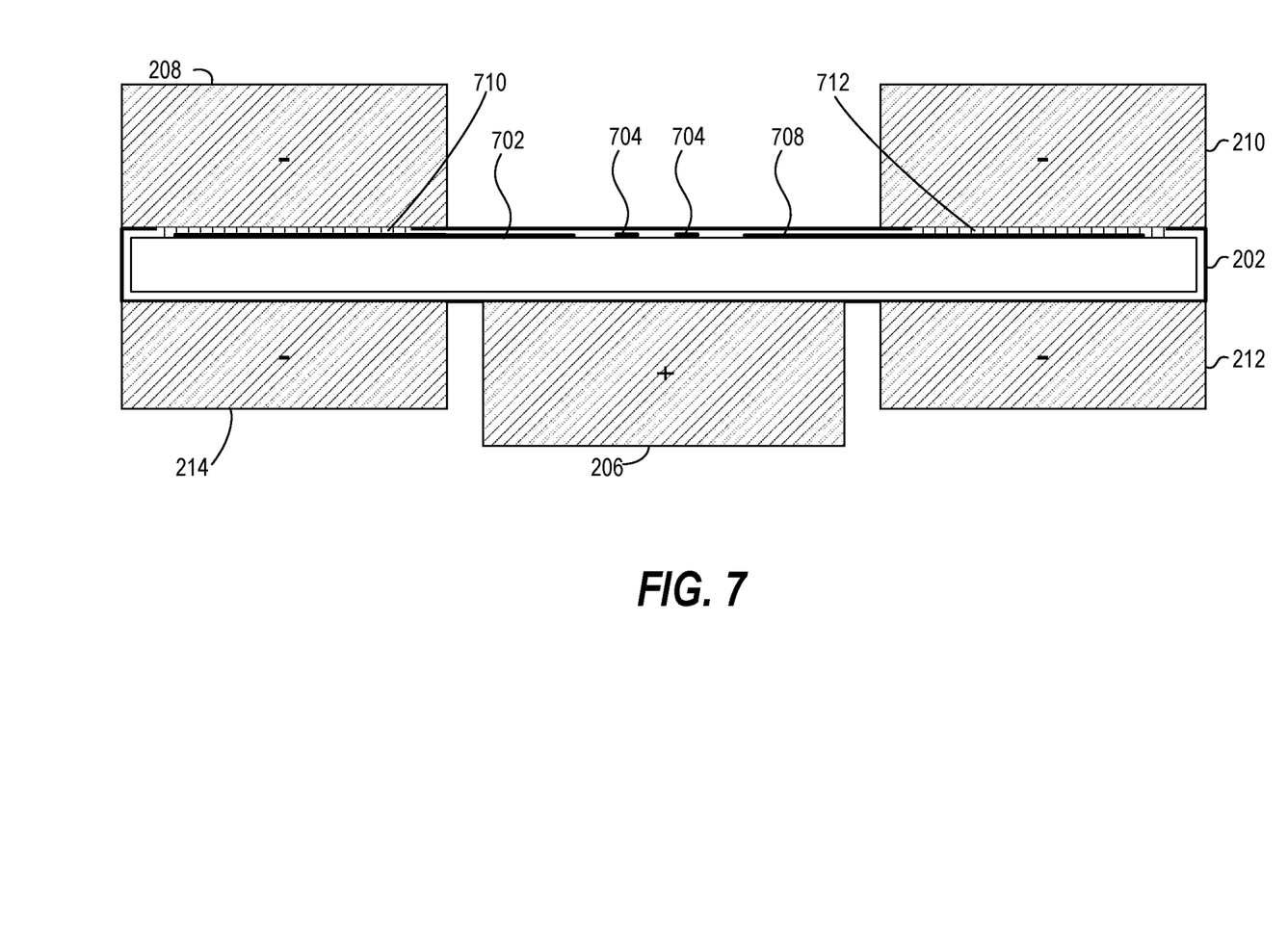
FIG. 7 shows a cross-sectional view of the light strip of FIG. 4 taken along cutline C.

FIG. 7 shows a cross-sectional view of the light strip of FIG. 4 taken along cutline C. FIG. 7 shows the connection of traces from two contact pads of two pairs of the contact pads of the last SSL package 432 to the ground rails 208 and 210.

The traces 702, 704, 706, and 708 are disposed on the front side of substrate 202. The conductive material of the ground rails 208 and 210 is exposed through respective openings that can be filled with conductive adhesive 710 and 712. The traces extend to the openings for electrical connection by the conductive adhesive.

Figure 8:
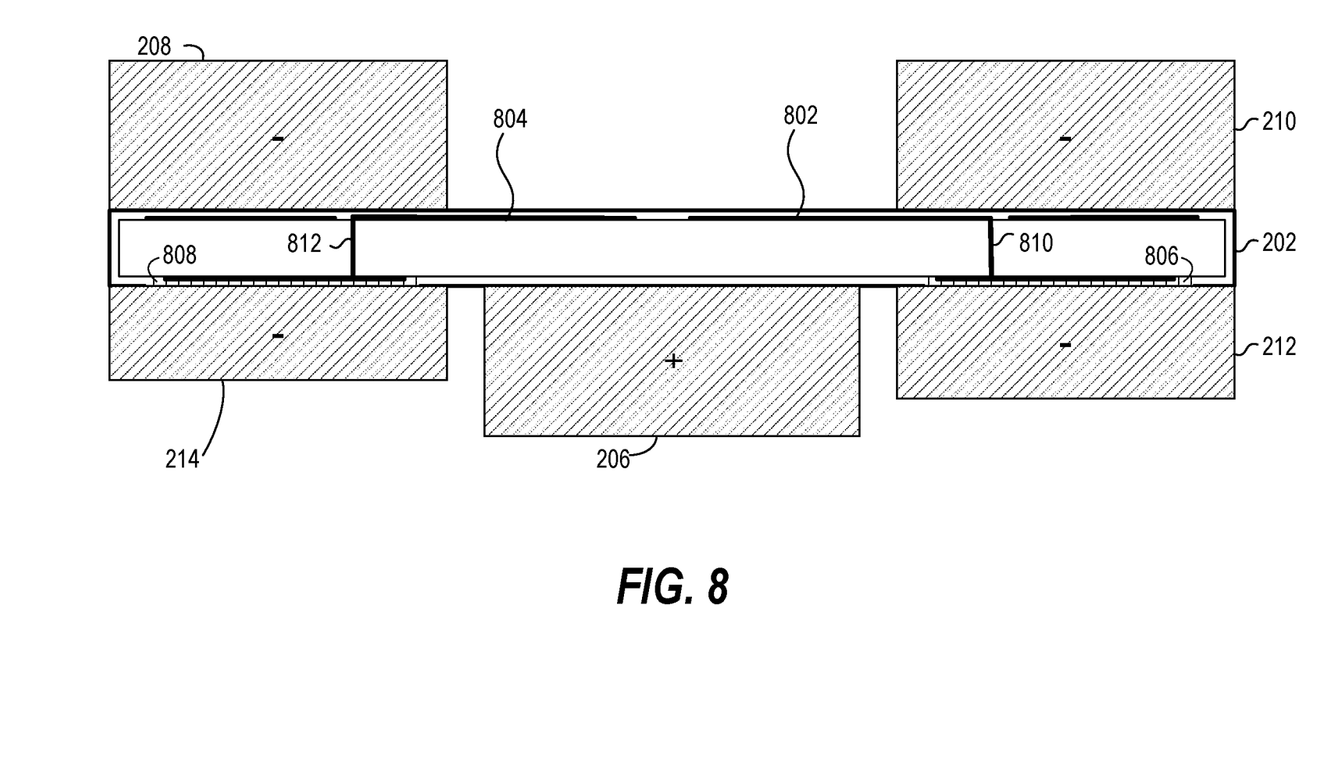
FIG. 8 shows a cross-sectional view of the light strip of FIG. 4 taken along cutline D.

FIG. 8 shows a cross-sectional view of the light strip of FIG. 4 taken along cutline D. FIG. 8 shows the connection of traces from two contact pads of two pairs of the contact pads of the last SSL package 432 to the ground rails 212 and 214.

The traces 802 and 804 are disposed on the front side of substrate 202. The conductive material of the ground rails 212 and 214 is exposed through respective openings that can be filled with conductive adhesive 806 and 808. The traces extend to the openings and connect to vias 810 and 812, which extend through the substrate to contact the conductive adhesive and electrically connect to the conductive material of the ground rails.

FIG. 9 shows a partial cross-sectional view of a portion of an edge-lit lighting apparatus having the light strip of FIG. 4 wrapped around an edge of a light-diffusive panel 102. The light strip is folded along the fold lines shown in FIG. 4. The SSL element 902 of SSL package 904 is arranged to emit light directed at an edge of the panel 102. Contact pads 906 and 908 connect to the positive and negative terminals of the SSL element.

As the width of the SSL package 904 may be wider than the thickness of the panel, the excess spaces between the substrate 102 and the faces of the panel can be at least partially filled by the ground rails and additional filler material or adhesive. The light strip can be adhered to a carrier (not shown) or alternative structure for support and attachment to the panel.

Figure 10:
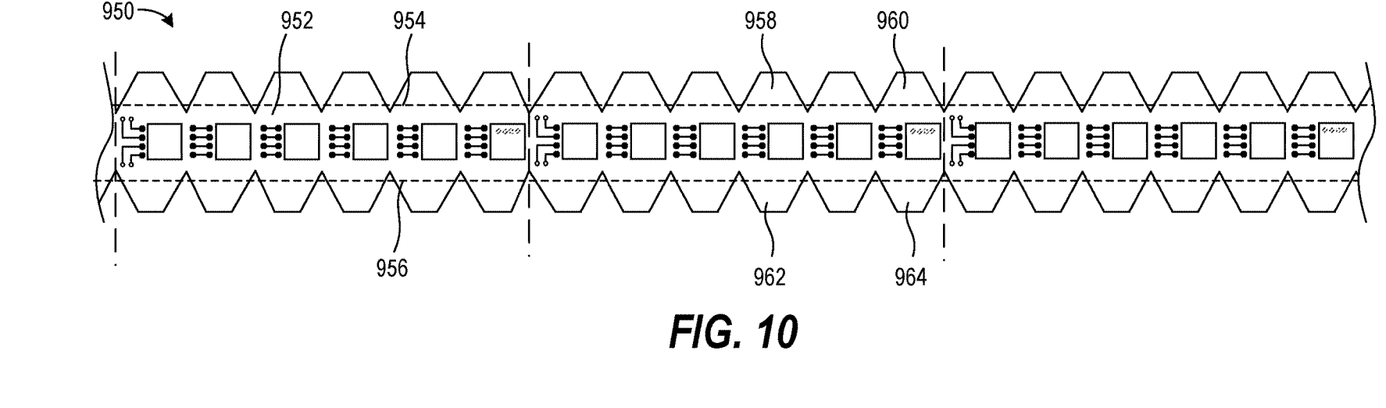
FIG. 10 shows a top view of a portion of an exemplary light strip having three groups of SSL packages.

FIG. 10 shows a top view of a portion of an exemplary light strip 950 having three groups of SSL packages. The SSL packages and groups of packages of FIG. 10 are the same as those shown in FIG. 3. The light strip 950 is configured for attaching to a light-diffusive panel having curved edges, such as a circular or elliptical panel.

To allow folding of the substrate 952 along the fold lines 954 and 956 and bending of the substrate to conform to the curved edge of a panel, the substrate is notched, leaving flaps to support the ground rails. Example ones of the flaps include flaps 958, 960, 962, and 964.

The supply rail can be attached to the backside of the flexible substrate 952 as described above. The ground rails (not shown) can be attached to the substrate after the substrate has been formed into the desired shape, and the flaps of the substrate have been folded.

Figure 11:
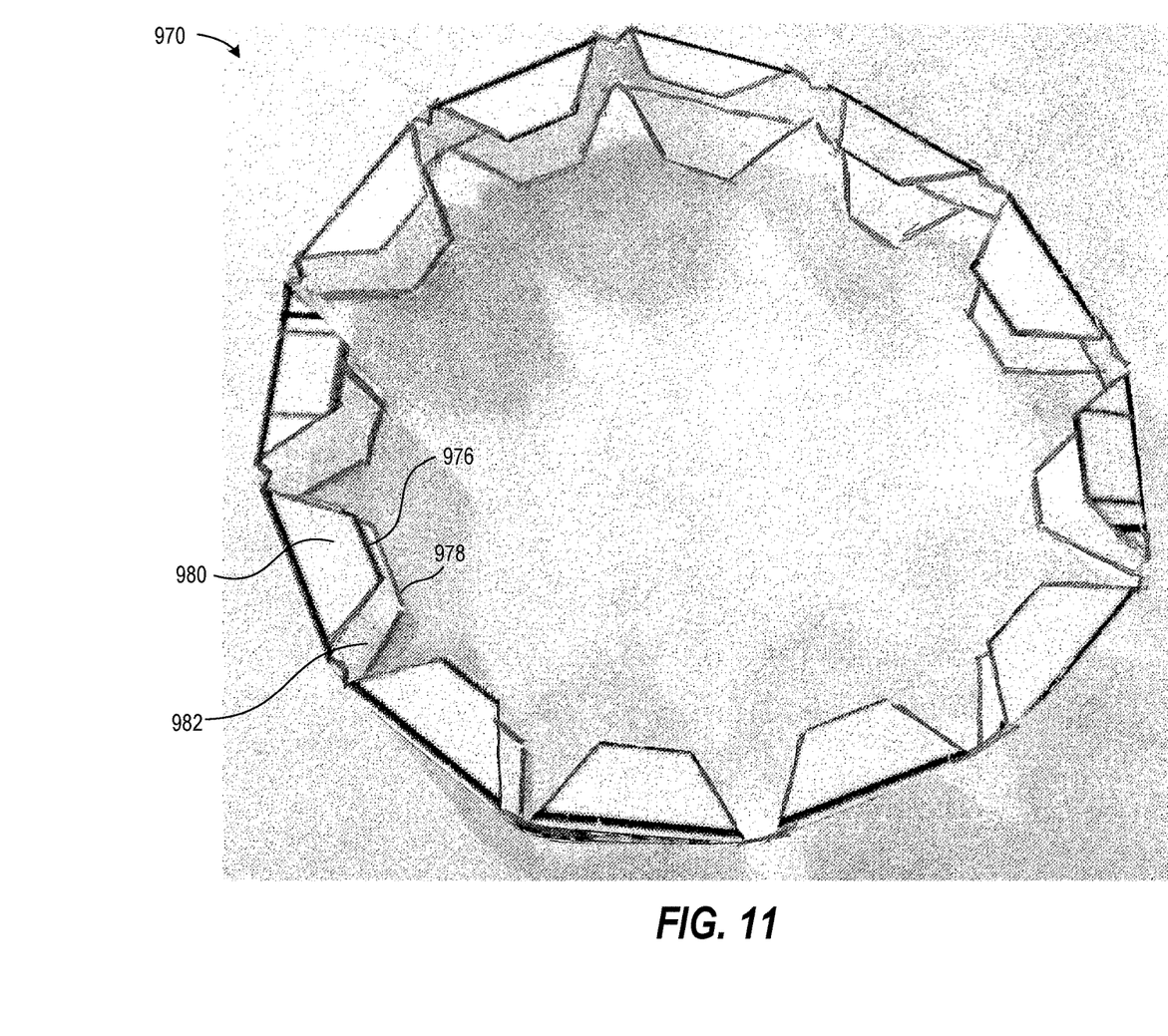
FIG. 11 shows a view of an exemplary light strip formed into a circular shape.

FIG. 11 shows a view of an exemplary light strip 970 formed into a circular shape. The light strip can be attached to a circular light-diffusive panel (not shown). The SSL packages (not shown) can be arranged such that the SSL elements (not shown) emit light into an edge of the panel.

The ground rails are not shown for purposes of illustrating the shape into which the substrate 202 is formed by folding of the flaps (e.g., 976 and 978) and the bending of the substrate into a circular shape. It will be appreciated that terminal ends of the supply rail (not shown) and ground rails (not shown) can be connected to a power source.

As explained above, the number of ground rails attached to the flaps can vary according to the number of SSL elements to be controlled on each SSL package. For four SSL elements, two of the ground rails can be attached to the outside surfaces of the flaps, and the other two ground rails can be attached to the inside surfaces of the flaps. The outside surface of a flap is exemplified by outside surface 980 of flap 976, and the inside surface of a flap is exemplified by inside surface 982 of flap 978. When attached to a light-diffusive panel, the outside surface of a flap faces away from the panel, and the inside surface of a flap faces toward the panel.

Though aspects and features may in some cases be described in individual figures, it will be appreciated that features from one figure can be combined with features of another figure even though the combination is not explicitly shown or explicitly described as a combination.

The present invention is thought to be applicable to a variety of lighting applications. Other aspects and embodiments will be apparent to those skilled in the art from consideration of the specification and practice disclosed herein. It is intended that the disclosed apparatus and method be considered as examples only, with a true scope of the invention being indicated by the following claims.

What is claimed is:

1. A lighting apparatus, comprising:
an elongate substrate having opposite first and second surfaces and a longitudinal axis;
a supply rail disposed on the second surface of the substrate;
a first ground rail disposed on the first surface and along a first elongate edge of the substrate;
a second ground rail disposed on the first surface and along a second elongate edge of the substrate;
a plurality solid state lighting (SSL) packages disposed parallel to the longitudinal axis and between the first and second ground rails on the first surface of the substrate, wherein the plurality of SSL packages includes a first package and a last package, and each package has a plurality of SSL elements disposed on a first side and pairs of contact pads disposed on a second side opposite the first side; and
wherein:
the SSL packages are serially coupled from the first package to the last package;
one contact pad of each pair of the contact pads of the first package is coupled to the supply rail through the substrate,
one contact pad of a first pair of the pairs of contact pads of the last package is coupled to the first ground rail at the first surface of the substrate, and
one contact pad of a second pair of the pairs of contact pads of the last package is coupled to the second ground rail at the first surface of the substrate.

2. The lighting apparatus of claim 1, wherein the SSL elements of each package are disposed parallel to the longitudinal axis of the substrate.

3. The lighting apparatus of claim 2, wherein each SSL package has four SSL elements and first, second, third, and fourth pairs of contact pads, and the lighting apparatus further comprising:
a third ground rail disposed on the second surface and along the first elongate edge of the substrate;
a fourth ground rail disposed on the second surface and along the second elongate edge of the substrate; and
wherein:
one contact pad of the third pair of the contact pads of the last SSL package is coupled to the third ground rail at the second surface of the substrate, and
one contact pad of the fourth pair of the contact pads of the last SSL package is coupled to the fourth ground rail at the second surface of the substrate.

4. The lighting apparatus of claim 3, wherein:
the substrate has an electrically insulative coating over conductive traces on the first and second surfaces;
the coating has an opening that exposes traces on the second surface of the substrate for coupling the one contact pad of each pair of contact pads of the first SSL package to conductive material of the supply rail;
the coating has an opening that exposes a trace on the first surface of the substrate for coupling the one contact pad of the first pair of contact pads of the last SSL package to the first ground rail;
the coating has an opening that exposes a trace on the first surface of the substrate for coupling the one contact pad of the second pair of contact pads of the last SSL package to the second ground rail;
the coating has an opening that exposes a trace on the second surface of the substrate for coupling the one contact pad of the third pair of contact pads of the last SSL package to the third ground rail; and
the coating has an opening that exposes a trace on the second surface of the substrate for coupling the one contact pad of the fourth pair of contact pads of the last SSL package to the fourth ground rail.

5. The lighting apparatus of claim 1, wherein the serially coupling from the first SSL package to the last SSL package includes traces on the first surface of the substrate between pairs of the SSL packages, and traces on the second surface of the substrate beneath each package.

6. The lighting apparatus of claim 1, wherein:
the substrate has an electrically insulative coating over conductive traces on the first and second surfaces;
the coating has a first opening that exposes traces on the second surface of the substrate for coupling the one contact pad of each pair of contact pads of the first SSL package to conductive material of the supply rail;
the coating has a second opening that exposes a trace on the first surface of the substrate for coupling the one contact pad of the first pair of contact pads of the last SSL package to the first ground rail; and
the coating has a third opening that exposes a trace on the second surface of the substrate for coupling the one contact pad of the second pair of contact pads of the last SSL package to the second ground rail.

7. The lighting apparatus of claim 6, wherein:
the serially coupling from the first SSL package to the last SSL package includes traces on the first surface of the substrate between pairs of the SSL packages, and traces on the second surface of the substrate beneath each package; and
conductive adhesive is disposed in the second and third respective openings in the coating of the substrate.

8. The lighting apparatus of claim 1, wherein:
the first elongate edge and the second elongate edge of the substrate are notched, leaving first flaps along the first elongate edge and second flaps along the second elongate edge;
the first ground rail is disposed on the first flaps; and
a second ground rail is disposed on the second flaps.

9. A lighting apparatus, comprising:
a light-diffusive panel having opposing faces bounded by one or more sides, wherein the light-diffusive panel has a plurality of disruptions on a first face of the opposing faces; and
a light strip attached to one of the sides of the light-diffusive panel, wherein the light strip includes:
an elongate substrate having opposite first and second surfaces and a longitudinal axis;
a supply rail disposed on the second surface of the substrate;
a first ground rail disposed on the first surface and along a first elongate edge of the substrate;
a second ground rail disposed on the first surface and along a second elongate edge of the substrate;
a plurality of solid state lighting (SSL) packages disposed parallel to the longitudinal axis and between the first and second ground rails on the first surface of the substrate, wherein the plurality of packages includes a first package and a last package, and each package has a plurality of SSL elements disposed on a first side and pairs of contact pads disposed on a second side opposite the first side; and wherein:
the SSL packages are serially coupled from the first package to the last package;
one contact pad of each pair of the contact pads of the first package is coupled to the supply rail through the substrate,
one contact pad of a first pair of the pairs of contact pads of the last package is coupled to the first ground rail at the first surface of the substrate, and
one contact pad of a second pair of the pairs of contact pads of the last package is coupled to the second ground rail at the first surface of the substrate.

10. The lighting apparatus of claim 9, wherein the SSL elements of each package are disposed parallel to the longitudinal axis of the substrate.

11. The lighting apparatus of claim 10, wherein each SSL package has four SSL elements and first, second, third, and fourth pairs of contact pads, and the lighting apparatus further comprising:
a third ground rail disposed on the second surface and along the first elongate edge of the substrate;
a fourth ground rail disposed on the second surface and along the second elongate edge of the substrate; and wherein:
one contact pad of the third pair of the contact pads of the last SSL package is coupled to the third ground rail at the second surface of the substrate, and
one contact pad of the fourth pair of the contact pads of the last SSL package is coupled to the fourth ground rail at the second surface of the substrate.

12. The lighting apparatus of claim 11, wherein:
the substrate has an electrically insulative coating over conductive traces on the first and second surfaces;
the coating has an opening that exposes traces on the second surface of the substrate for coupling the one contact pad of each pair of contact pads of the first SSL package to conductive material of the supply rail;
the coating has an opening that exposes a trace on the first surface of the substrate for coupling the one contact pad of the first pair of contact pads of the last SSL package to the first ground rail;
the coating has an opening that exposes a trace on the first surface of the substrate for coupling the one contact pad of the second pair of contact pads of the last SSL package to the second ground rail;
the coating has an opening that exposes a trace on the second surface of the substrate for coupling the one contact pad of the third pair of contact pads of the last SSL package to the third ground rail; and
the coating has an opening that exposes a trace on the second surface of the substrate for coupling the one contact pad of the fourth pair of contact pads of the last SSL package to the fourth ground rail.

13. The lighting apparatus of claim 9, wherein the serially coupling from the first SSL package to the last SSL package in each group includes traces on the first surface of the substrate between pairs of the SSL packages, and traces on the second surface of the substrate beneath each package.

14. The lighting apparatus of claim 9, wherein:
the substrate has an electrically insulative coating over conductive traces on the first and second surfaces;
the coating has a first opening that exposes traces on the second surface of the substrate for coupling the one contact pad of each pair of contact pads of the first SSL package to conductive material of the supply rail;
the coating has a second opening that exposes a trace on the first surface of the substrate for coupling the one contact pad of the first pair of contact pads of the last SSL package to the first ground rail; and
the coating has a third opening that exposes a trace on the second surface of the substrate for coupling the one contact pad of the second pair of contact pads of the last SSL package to the second ground rail.

15. The lighting apparatus of claim 14, wherein:
the serially coupling from the first SSL package to the last SSL package includes traces on the first surface of the substrate between pairs of the SSL packages, and traces on the second surface of the substrate beneath each package; and
conductive adhesive is disposed in the second and third respective openings in the coating of the substrate.

16. The lighting apparatus of claim 9, wherein:
the first elongate edge and the second elongate edge of the substrate are notched, leaving first flaps along the first elongate edge and second flaps along the second elongate edge;
the first ground rail is disposed on the first flaps; and
a second ground rail is disposed on the second flaps.

* * * * *